Sept. 29, 1970 G. H. L. BUREAU 3,531,798
NUMERICAL CODING
Filed June 2, 1966 2 Sheets-Sheet 1
Fig.1
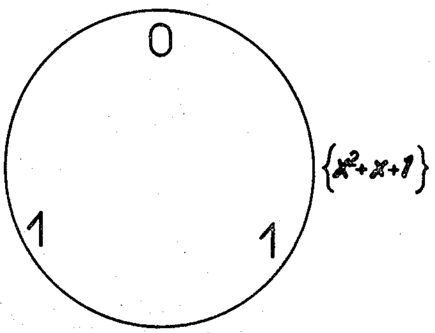
Fig.2
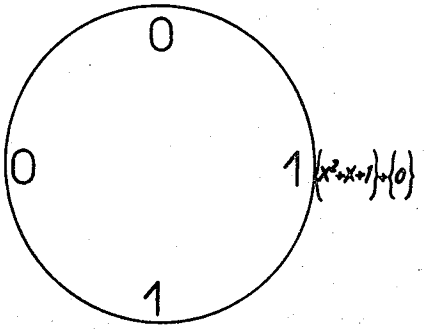
Fig.3
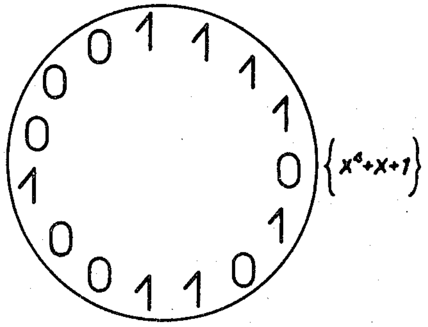
Fig.4
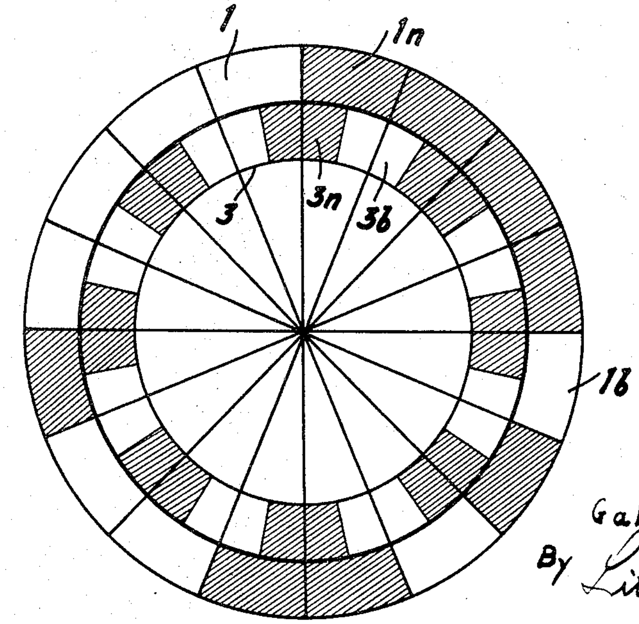
Fig.5
| | |
|---|---|
| 0000 | a |
| 0001 | 2a |
| 0010 | 3a |
| 0100 | 4a |
| 1001 | 5a |
| 0011 | 6a |
| 0110 | 7a |
| 1101 | 8a |
| 1010 | 9a |
| 0101 | 10a |
| 1011 | 11a |
| 0111 | 12a |
| 1111 | 13a |
| 1110 | 14a |
| 1100 | 15a |
| 1000 | 16a |
$a = \pi/8$
Inventor
Gabriel Henri Léon Bureau
By Littlepage & Quaintance
Attys.

Sept. 29, 1970 G. H. L. BUREAU 3,531,798

NUMERICAL CODING

Filed June 2, 1966 2 Sheets-Sheet 2

Inventor
Gabriel Henri Léon Bureau
By Littlepage & Quaintance
Attys.

United States Patent Office 3,531,798
Patented Sept. 29, 1970

3,531,798

NUMERICAL CODING

Gabriel Henri Léon Dureau, Le Perreux, France, assignor to Société Anonyme: Société Alsacienne de Constructions Atomiques de Telecommunications et d'Electronique "Alcatel," Paris, France, a corporation of France Filed June 2, 1966, Ser. No. 554,839
Claims priority, application France, June 4, 1965, 19,687
Int. Cl. G08c 9/00
U.S. Cl. 340—347 1 Claim

ABSTRACT OF THE DISCLOSURE

A position-coded track is read precisely at the center of code digits by employing digital transitions on an auxiliary track for precisely controlling timing reading of the main track and shifting of a shift register. The position code of the first shift register is constantly compared with self-generated codes in a second shift register which is keyed by transitions on the auxiliary track.

BACKGROUND OF THE INVENTION

This invention relates to a method of numerical coding and more particularly to a method of numerical coding making it possible to eliminate errors, ambiguities, and indefiniteness in the indications of position of devices which must be situated with very great accuracy. The invention also relates to devices for carrying out this method, as well as to the applications of such devices.

The increasingly numerous applications of automation require the measurement with increasing accuracy of the position, which may be called the coordinates, of parts which move in relation to one another, this position being definable by distance or angles or by distances and angles. This is so for example in the case of linear or circular displacements, particularly in the accurate measurement of displacements of different moving parts of machines, in the tracking of radar aerials, in all servo mechanisms, and in a general manner whenever it is necessary to read and utilise angles and distances with great accuracy.

The use of computers to measure coordinates and then supervise and control the displacements of different parts makes it necessary to convert the coordinates into numerical data, which are preferably binary.

The conversion of positions into numerical data is at the present time effected with the aid of transversal coding systems, that is to say counting systems.

In transversal coding systems the distance from a clearly determined origin is simply written, as on graduated rules. For convenience of automatic reading, and particularly in order to obtain the required dimensions with the desired accuracy while using a limited space for entries, it is necessary to enter the different figures of the number expressing the distance on a line perpendicular to the axis of translation (or on a radius in shaft position detectors).

The direct entry of coordinates in binary notation may give rise to ambiguity in readings. A known solution for reducing the chances of ambiguity consists in utilising a plurality of total readings of the figures of the various positions. If it is desired to obtain a certain reliability and a certain accuracy, it is necessary to increase considerably the number of binary figures. The apparatus then becomes more complex and the technological difficulties rapidly increase.

In counting systems the technological difficulties are less severe, because the tracks are usually reduced to one or two. The systems function by addition of unit pulses when advancing in a certain direction, and by subtraction of unit pulses when advancing in the other direction. The addition and subtraction device is restored to zero in a determined position. However, it will easily be understood that in a system of this type there can be no warning of any error in counting which may be committed; all the positions indicated will then be false and in order to obtain correct indications once again it will then be necessary for the operator to effect a return to the zero position.

An improvement of these known methods of coding is described in French Pat. No. 969,942 of July 28, 1948, which reveals a method of coding in which a series of binary figures is such that if in this series all the codes formed of N successive figures are examined in succession, each of these codes will be found only once. Nevertheless, in this method of coding the sequence utilised is not a sequence of cyclic codes complying with the definition given in the work by Peterson, "Error Correcting Codes," published in 1961 by the Massachusetts Institute of Technology.

Nevertheless, the sequence utilised in the aforesaid patent is one of the $$2^{2N-1}-N$$

sequences capable of being formed and used. The formation of this sequence did not obey any mathematical law, and this consequence could not be utilised to reconstitute codes. As no reconstituted codes were available, the method of the aforesaid patent could therefore not make it possible to detect errors.

It is clear that these known solutions do not enable the precise problems indicated above to be solved, and the obtaining of accuracy without ambiguity still remains to be achieved.

SUMMARY OF THE INVENTION

The invention proposes to provide accuracy of this type, while avoiding both the disandvantages of position determining devices which utilise transverse coding systems and the disadvantages of devices which utilise counting systems. To this end, the idea was conceived of defining the position of a moving system by means of a code which is taken from a series of successive codes of N binary figures having $(N-1)$ figures in common with the preceding figure and the following figure, by utilising a sequence of cyclic codes in accordance with the definitions given by Peterson (see chapter 8, page 137 onwards in the above-mentioned work). It is in fact known that such a sequence of codes can be formed mathematically with the aid of a generator polynomial of N degree, to which an assembly of shift registers and modulo 2 adders, of which examples are given in the aforesaid work by Peterson, particularly in chapter 8, page 148 onwards, is caused to correspond from the electronic point of view.

In these circumstances, the method of determination with accuracy and without ambiguity of situations, for example of positions of moving elements defined in polar or rectangular coordinates, utilising binary figure codes, consists fundamentally in defining said situations or relative positions by sequences of cyclic codes composed of "zeros" and "ones," these codes being, starting from a generator polynomial, the elements of the class of Peterson's modulo 2 residues, recording said codes sequentially on at leeast one track, driving said track by means of the moving elements, and then reading on the track, by any suitable means and at any desired moment, the positions or situations of the elements at that moment, an auxiliary registration of zeros and ones being arranged parallel to said sequential registrations, in such a manner as to pass from zero to one or inversely from one to zero, at the equidistant points of two successive coded registrations.

Irreducible polynomials are preferably used which make it possible to obtain sequences comprising $2^N-1$ different non-zero codes.

In the event of a plurality of recording tracks being used, it is advantageous for them to be selected to be parallel to one another.

An apparatus for carrying out the abovedescribed method comprises essentially a series of parallel tracks, on each of which sequences of cyclic codes are recorded, means for displacing the tracks in dependence on the displacement of the moving elemnts, means of any known type for reading on the tracks the positions of the elements, and, optionally, means for ensuring that the readings will serve to control the displacement of the elements in dependence on the readings.

The tracks may be parallel bands and/or concentric discs, depending on the rectangular and/or angular coordinates to be determined.

The cyclic codes may be recorded for any suitable store and particularly in shift registers having as many stages as there are figures to be recorded.

The auxiliary recording, which contributes towards eliminating indefiniteness in reading is advantageously effected in the form of an auxiliary track composed alternately of zeros and ones and parallel to at least one of the tracks carrying the coded recordings, with means for shifting the shift registers and introduction of the figure following a reading only when the codes are exactly opposite the reading means.

According to one characteristic of the invention, a plurality of sequences of cyclic codes may be recorded on the tracks (discs or tapes); these sequences may have different lengths, while the shortest sequences may be repeated because the sequences can be placed one at the end of the other. With arrangements of this type it is possible for the positions first to be roughly determined and then determined accurately in element positioning systems.

The recording or registering and reading means may be of any suitable known type. Tracks having white and black areas, which are read with the aid of photoelectric cells, may be used. Discs or perforated tapes, which are read by electro-optical means, may also be employed. Amongst other examples, use may be made of all known magnetic recording and transcription methods.

The tracks for example comprise equal sectors, some of which correspond to the ones and others to the zeros of the sequence of codes formed by the generator polynomials, which may be supplemented by a neutral formed of zeros.

According to the invention it is advantageous to provide means for placing the information, originating from reading heads of any suitable type, in shift registers having as many stages as there are figures to be recorded. In these circumstances a positioning or recording channel is normally composed of a track, a reading head, amplification means, and a shift register. The auxiliary track provided, composed alternately of zeros and ones, passes from 0 to 1 or inversely when the reading heads controlling the recording channels are situated in the middle of the sectors dividing the cyclic code tracks. Means convert the information from the auxiliary track into pulses which in each of the recording channels control the shifting of the shift register, the latter retaining the successive figures of the preceding code less one figure and at the same moment receiving the figure read by the reading head. It is thus seen that the reading heads are according to the invention situated exactly in the middle of the sectors at the moment when the reading is made, and errors in reading are thus reduced.

The apparatus described above may advantageously comprise additional devices composed of an additional shift register and a modulo 2 adder; these additional devices controlled by thep ulses coming from the auxiliary track continuously produce, in accordance with the procedures indicated by Peterson, particularly in pages 92 to 100 of the above-mentioned work, the sequences of codes identical to those which should be read on the cyclic code tracks. It is thus possible to compare continuously the contents of the shift registers of the recording channels and the contents of the auxiliary registers and detect errors due to false readings and to the reception of parasitic signals.

Various examples of performance of the method and construction of the apparatus according to the invention are described below with reference to the accompanying drawings, in which:

BRIEF DESCRIPTION OF THE DRAWINGS

FIG. 1 illustrates a three-position coding starting with a rotating disc,

FIG. 2 shows the coding illustrated in FIG. 3, to which a neutral element containing only zeros has been added, FIG. 3 illustrates a 15-position coding, FIG. 4 illustrates a reading disc comprising two cyclic code concentric tracks, FIG. 5 illustrates the code of the outer track of the disc illustrated in FIG. 4.

DETAILED DESCRIPTION OF THE DRAWING

Figures 6, 7:
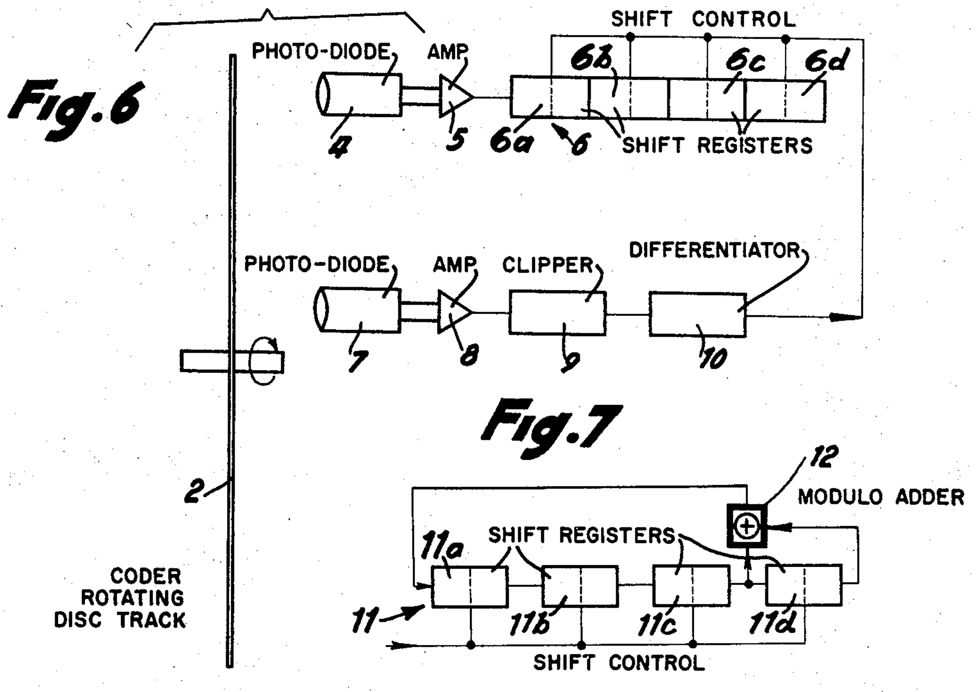
FIG. 6 illustrates an angular position reading device.
FIG. 7 illustrates a reference shift register intended to produce the sequence of codes equivalent to those which must be read on the outer track of the disc by the device illustrated in FIG. 6.

The coding illustrated in FIG. 1 is a two-figure coding, and consequently has $2^2-1=3$ positions per rotation. It originates from the generator polynomial $(X^2+X+1)$; the codes are therefore the elements of the modulo residue class $(X^2+X+1)$. These codes are 01–11–10.

The coding illustrated in FIG. 2 is the same two-figure coding to which however the neutral element has been added, that is to say a code comprising only zeros. The four following codes are thus obtained: 00–01–11–10.

The coding illustrated in FIG. 3 is a four-figure coding, that is to say having $2^4-1=15$ positions per revolution. These codes originate from the generator polynomial $(X^4+X+1)$ and are in succession:

| | | | | |
|---|---|---|---|---|
| 1000 | 0001 | 0010 | 0100 | 1001 |
| 0011 | 0110 | 1101 | 1010 | 0101 |
| 1011 | 0111 | 1111 | 1110 | 1100 |

In the examples of construction of coding devices for positioning which are described hereinbelow use has been made of a 16-position coding formed by a 15-position coding corresponding to the coding illustrated in FIG. 3, to which the neutral element comprising four zeros has been added.

The 16-position coding giving four-figure codes is materalised on the outer track 1 of the disc 2 illustrated in FIG. 4. The materialisation of the codes is effected by forming, on track 1, 16 black sectors $\mathbf{1}_n$ or white sectors $\mathbf{1}_b$ having an opening of $\pi/8$, the order of succession of said sectors corresponding to the code shown in FIG. 5. The disc 2 also carries an inner track 3 concentric to the previously mentioned track, said track 2 being likewise formed of 16 sectors, which are alternately black sectors $\mathbf{3}_n$ and white sectors $\mathbf{3}_b$, disposed in such a manner that the separation between two sectors $\mathbf{3}_n$ and $\mathbf{3}_b$ of different colours will be situated on the bisectrix of the angle at which a sector $\mathbf{1}_n$ or $\mathbf{1}_b$ of the outer track 1 is seen. The tracks 2 and 3 are illuminated by any suitable means.

For the sake of greater simplicity, the reading device and its mode of operation, as illustrated in FIG. 6, will be described simultaneously. The moving element is here a disc 2 rotating integrally with a rotating element of a machine, for example. When the disc 2 rotates, its position is determined by the information received by the photodiode 4 in dependence on the black or white elements illuminated on the track 1 and passing in front of it, said information being transmitted, after amplification in the amplifier 5, to the shift register 6 comprising four stages 6*a*, 6*b*, 6*c*, 6*d*. The shifting is controlled by pulses transmitted by the chain composing the photodiode 7, acted on by the track 3, the amplifier 8, the clipper 9, and the differentiator 10, on each transition of the interior track 3, that is to say on each passage from black to white on said track. The shifting of the register 6 is controlled by retaining three of the four figures of the preceding code, and this control introduces into the input stage the figure read by the photodiode 4 on the track 1 at that moment. The interior track 3 permits readings of the coded track 1 only when the cell 4 is situated in the middle of a black or white graduation of the track 1.

In this regard it will be noted that the inner track 3 may be considered as a coded track according to the invention and parallel to the cyclic coding tracks; said track 3 in fact carries a sequence of zeros and ones, which is in fact a sequence of half-graduations 00, 11, 00, 11, from which the cyclic series 00, 01, 11, 10 may be reconstituted by shifting the reading each time by one half-graduation, said cyclic series simply being that illustrated in FIG. 2.

The position of the disc 2 at each moment is determined by reading the contents of the register 6, comprising four stages 6*a*, 6*b*, 6*c*, 6*d*, the input stage 6*a* receiving the figure corresponding to the position of the disc at the moment in question, and the three following stages 6*b*, 6*c*, 6*d* containing the figures corresponding to the three successive positions of the disc which were read previously. These four figures form the code representing in one-one correspondence the position of the disc in accordance with sixteen discrete angles each having a value of $\pi/8$.

If it is desired to effect more accurate positioning or determination of the position and to reduce still further the probability of error, the device illustrated in FIG. 6 is supplemented by a shift register comprising four stages 11*a*, 11*b*, 11*c*, 11*d* and a modulo 2 adder 12, which are illustrated in FIG. 7.

The modulo 2 adder 12 then totalises the information of the stages 11*c* and 11*d* representing the roots of degrees 1 and 2 of the generator polynomial $X^4+X+1$ and returns this total to stage 11*a*. The theoretical explanation in the work by Peterson shows that the equality $\alpha^4=1+\alpha$ is thus obtained and makes it possible to produce the sequence of the cyclic code corresponding to the outer track 1 of the reading disc 2 illustrated in FIG. 6.

The shift register 11 receives the pulses originating from the reading of the inner track 3 of the disc 2 through the medium of the chain comprising the photodiode 7, amplifier 8, clipper 9, and differentiator 10.

If at a given moment it is assumed that a register 11 of this type contains the code equivalent to that contained in the register 6 illustrated in FIG. 6 and that its shift control originates from the differentiator 10 illustrated in FIG. 6, the result is that starting from this moment, when the disc 2 rotates, the register 11 will continuously have the same contents as the register 6.

In these circumstances, the assembly comprising the register 11 and the adder 12 continuously produces the sequence of codes as illustrated on the outer track 1 of the reading disc 2.

Figure 8:
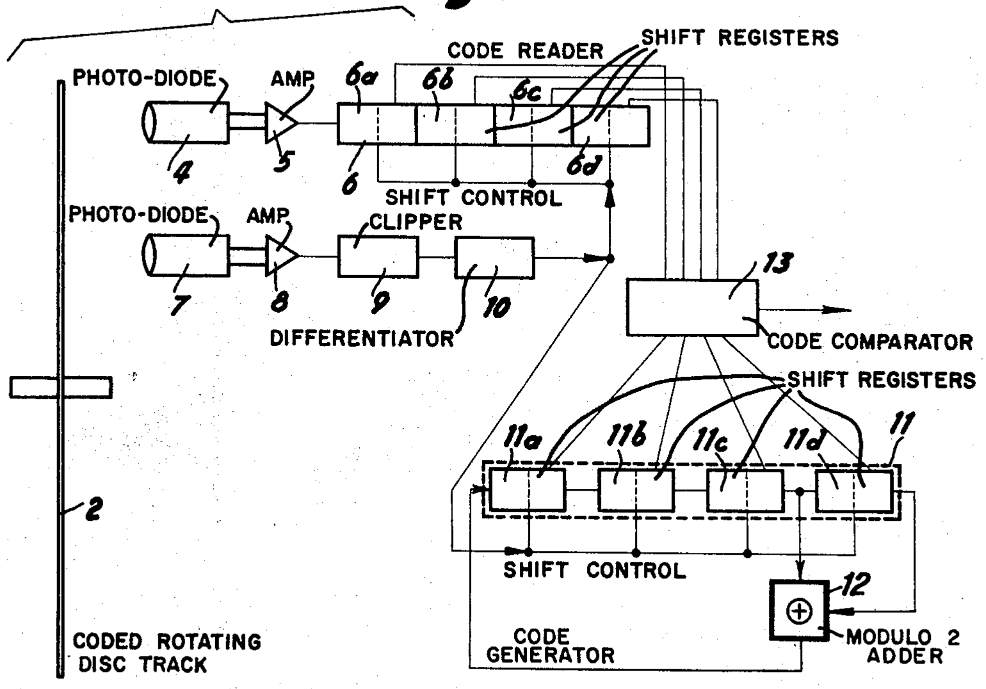
FIG. 8 illustrates another example of a reading device according to the invention.

The device illustrated in FIG. 8 constitutes a construction of a precision device according to the invention. This device is composed of a reading chain identical to that illustrated in FIG. 6 and of a modulo 2 adder-shift register assembly identical to that illustrated in FIG. 7, combined with a code comparator 13 disposed in such a manner as to effect the comparisons of the figures contained in the corresponding stages of the registers 6 and 11.

As has already been seen, the shift register 6 receives its information in the form of signals originating from the outer track 1 of the code disc 2, and its shift is controlled by signals originating from the inner track 3. The assembly comprising the four stages of the shift register 11 and the modulo 2 adder 12 is controlled directly by the signals originating from the inner track of the disc 2 and produces the code corresponding to that of the outer track 1 of the disc 2.

The figures contained in the corresponding stages of the two registers 6 and 11 are transmitted to the comparator 13, which issues information, for example in binary form, indicating whether or not the figures contained in the two registers are identical.

What is claimed is:

1. Track position indicating and error checking apparatus comprising:

a movable track having binary values sequentially arranged in a mathematically developable cyclic code, pulsing means mounted adjacent the track for sensing incremental movements of the track and for producing successive pulses upon successive incremental movements of the track, reading means relatively fixed adjacent the track and operatively connected to the pulsing means for reading successive binary values on successive portions of the track upon successive pulses from the pulsing means, a first shift register having a limited number of recording positions and being operatively connected to the reading means for recording binary values from the reading means, the first shift register being operatively connected to the pulsing means for successively transferring values in the first shift register for maintaining a like number of latest read binary values in their sequential order in the first shift register, wherein the sequential order of binary values in the first shift register indicates the position of the track with respect to the reading means, a second shift register operatively connected to the pulsing means for successively recording and transferring a like number of binary values in the second shift register, a modulo adder connected to the second shift register whereby two earliest recorded values in the second shift register are added by the adder for generating a binary value according to the two earliest recorded values in the second register, and wherein the adder is connected to the second shift register for inserting successive generated values therein, whereby an error checking sequence of a like limited number of latest generated binary values is stored in the second shift register, and comparator means connected to the first shift register and to the second shift register for comparing sequences of values therein and for producing an error signal upon disagreement between sequences.

References Cited

UNITED STATES PATENTS

| | | | |
|---|---|---|---|
| 3,143,730 | 8/1964 | McIntyre | 340—347 |
| 3,230,514 | 1/1966 | Kliman | 340—172.5 |

OTHER REFERENCES

W. W. Peterson Error-Correcting Codes, 1961, pages 232—235.

MAYNARD R. WILBUR, Primary Examiner

C. D. MILLER, Assistant Examiner

U.S. Cl. X.R.

340—146.1